(12) United States Patent
Kniajanski et al.

(10) Patent No.: US 8,697,279 B2
(45) Date of Patent: Apr. 15, 2014

(54) COMPOSITION AND ENERGY STORAGE DEVICE

(75) Inventors: Sergei Kniajanski, Clifton Park, NY (US); Andrey Ivanovich Meshkov, Niskayuna, NY (US); Grigorii Lev Soloveichik, Latham, NY (US); Michael Alan Vallance, Loudonville, NY (US)

(73) Assignee: General Electric Company, Niskayuna, NY (US)

( * ) Notice: Subject to any disclaimer, the term of this patent is extended or adjusted under 35 U.S.C. 154(b) by 572 days.

(21) Appl. No.: 13/007,123

(22) Filed: Jan. 14, 2011

(65) Prior Publication Data

US 2012/0183829 A1    Jul. 19, 2012

(51) Int. Cl.
*H01M 10/0563* (2010.01)
*H01M 10/30* (2006.01)
*H01M 10/39* (2006.01)
*H01M 4/38* (2006.01)

(52) U.S. Cl.
USPC ........... 429/199; 429/103; 429/221; 429/223; 429/231.9

(58) Field of Classification Search
None
See application file for complete search history.

(56) References Cited

U.S. PATENT DOCUMENTS

| | | | |
|---|---|---|---|
| 3,992,222 A | 11/1976 | Walsh et al. | |
| 4,250,236 A | 2/1981 | Haschka et al. | |
| 4,288,506 A | 9/1981 | Coetzer et al. | |
| 4,529,676 A | 7/1985 | Galloway et al. | |
| 4,592,969 A | 6/1986 | Coetzer et al. | |
| 4,626,483 A | 12/1986 | Bones et al. | |
| 4,797,333 A | 1/1989 | Coetzer et al. | |
| 4,975,343 A | 12/1990 | Coetzer | |
| 5,283,135 A | 2/1994 | Redey et al. | |
| 5,340,668 A | 8/1994 | Redey et al. | |
| 5,372,681 A | 12/1994 | Iacovangelo et al. | |
| 5,403,676 A | 4/1995 | Coetzer et al. | |
| 5,476,733 A | 12/1995 | Coetzer et al. | |
| 5,536,593 A | 7/1996 | Redey et al. | |
| 5,573,873 A | 11/1996 | Bugga et al. | |
| 5,604,053 A | 2/1997 | Coetzer et al. | |
| 5,972,533 A | 10/1999 | Coetzer et al. | |
| 6,207,324 B1 | 3/2001 | Licht | |
| 8,329,336 B2 * | 12/2012 | Soloveichik et al. | ......... 429/199 |
| 2008/0145749 A1 | 6/2008 | Iacovangelo et al. | |
| 2009/0162736 A1 | 6/2009 | Vallance et al. | |
| 2009/0233170 A1 | 9/2009 | Iacovangelo et al. | |
| 2009/0291365 A1 | 11/2009 | Iacovangelo et al. | |
| 2010/0019718 A1 | 1/2010 | Salasoo et al. | |

(Continued)

OTHER PUBLICATIONS

Bones et al.; "Development of a Ni, NiCl2 Positive Electrode for a Liquid Sodium (ZEBRA) Battery Cell"; Journal of the Electrochemical Society; vol. 136, Issue 5; May 1989; pp. 1274-1277.

(Continued)

*Primary Examiner* — Jonathan Crepeau
(74) *Attorney, Agent, or Firm* — Francis T. Coppa

(57) ABSTRACT

In one embodiment, a cathode composition comprises a transition metal and/or a transition metal salt, wherein the transition metal is selected from the group consisting of nickel, iron, cobalt, chromium, manganese, molybdenum, zinc, and antimony, and a combination comprising at least one of the foregoing; an alkali metal halide; an electrolyte salt comprising an alkali metal halide and a metal halide; and a sulfide compound selected from the group consisting of gallium sulfide, antimony sulfide, and a combination comprising at least one of the foregoing. An energy storage device comprising the electrode composition is also provided.

20 Claims, 6 Drawing Sheets

(56) References Cited

U.S. PATENT DOCUMENTS

2010/0058578 A1    3/2010    Vallance et al.
2010/0062331 A1    3/2010    Vallance et al.
2010/0062334 A1    3/2010    Vallance et al.
2010/0233864 A1    9/2010    Lee et al.

OTHER PUBLICATIONS

U.S. Appl. No. 12/611,993; filed Nov. 4, 2009; "Cathode Compositions Comprising ZN and Chalcogenide and Energy Storage Cell Comprising the Same".

Prakash et al.; "Effect of Chemical Additives on the Performance of Na/NiCl2 Cells"; Ionics; vol. 6; 2000; pp. 210-217.

Prakash et al.; "Electrochemical Behavior of Nonporous Ni/NiCl2 Electrodes in Chloroaluminate Melts"; Journal of The Electrochemical Society; vol. 147, Issue 2; 2000; pp. 502-507.

Prakash et al.; "Effect of Sodium Iodide Additive on the Electrochemical Performance of Sodium/Nickel Chloride Cells"; Journal of Applied Electrochemistry; vol. 30; 2000; pp. 1229-1233.

Ratnakumar et al; "Effects of Sulfur Additive on the Performance of Na/NiCl2 Cells"; Journal of Power Sources; vol. 48; 1994; pp. 349-360.

Sudworth, J.L.; "The Sodium/Nickel Chloride (ZEBRA) Battery"; Journal of Power Sources; vol. 100; 2001; pp. 149-163.

\* cited by examiner

COMPOSITION AND ENERGY STORAGE DEVICE

BACKGROUND OF THE INVENTION

The invention includes embodiments that relate to an electrode composition. The invention includes embodiments that relate to an electrode for an energy storage device.

Metal chloride batteries with a molten sodium anode and a beta-alumina solid electrolyte are widely employed for energy storage applications. The energy storage application can include mobile applications, due to their high energy density and long cycle life. To be applicable for mobile applications like hybrid locomotives or plug-in electric vehicles (PHEV), the sodium nickel chloride battery should tolerate power surges (high currents) at both battery charging and discharging, without loss in the working capacity and the cycle life. The sodium nickel chloride batteries are used because of their high theoretical energy density (790 Wh/kg), in addition to their ability to operate over a wide temperature range. The cathode of such a battery is built from nickel metal, sodium chloride NaCl, and a molten secondary electrolyte, $NaAlCl_4$. Nickel is present in excess, and the battery's theoretical capacity is determined by the amount of NaCl. However, the practical energy density after the first full battery charge is much lower than the theoretical value, and the cycle life of such a battery is very short.

The most common way to improve the cell performance is an addition of a small amount of additives to the cathode composition. The use of sodium salts of other halogens (NaF, NaBr and NaI) and elemental sulfur as additives have been tried. However, the above approaches had disadvantages of low working capacity or, in the case of sulfur, non-uniform distribution causing high variability in the battery performance and fast degradation. Addition of iron monosulfide FeS allowed for better sulfur distribution in the electrochemical cell and less variability. However, the above electrodes containing FeS and S in combination with NaX (X=F, Br, I), were not suitable for high current applications because of low working capacity and fast degradation of cells.

Therefore, there exists a need for an improved solution to the long-standing problem of high current cell performance by addition of additives for the electrode that significantly improves the cell working capacity and decreases the capacity degradation rate.

BRIEF DESCRIPTION OF THE INVENTION

In one embodiment, a cathode composition comprises: a transition metal and/or a transition metal salt, wherein the transition metal is selected from the group consisting of nickel, iron, cobalt, chromium, manganese, molybdenum, zinc, antimony, and combinations comprising at least one of the foregoing; an alkali metal halide; an electrolyte salt comprising an alkali metal halide and a metal halide; and a sulfide compound selected from the group consisting of gallium sulfide, antimony sulfide, and a combination comprising at least one of the foregoing. An article such as an energy storage device comprising the electrode composition is also provided.

In one embodiment, an energy storage device comprises: a first compartment comprising metallic alkali metal; a second compartment comprising a cathode composition; and a solid separator capable of transporting alkali metal ions between said first and second compartments. The cathode composition can comprise: a transition metal and/or a transition metal salt, wherein the transition metal is selected from the group consisting of nickel, iron, cobalt, chromium, manganese, molybdenum, zinc, and antimony, combinations comprising at least one of the foregoing; an alkali metal halide; an electrolyte salt comprising an alkali metal halide and a metal halide; and a sulfide compound selected from the group consisting of gallium sulfide, antimony sulfide, and a combination comprising at least one of the foregoing.

BRIEF DESCRIPTION OF THE DRAWINGS

These and other features and aspects of the present invention will become better understood when the following detailed description is read with reference to the accompanying drawings in which like characters represent like parts throughout the drawings.

DETAILED DESCRIPTION OF THE INVENTION

Figure 1:
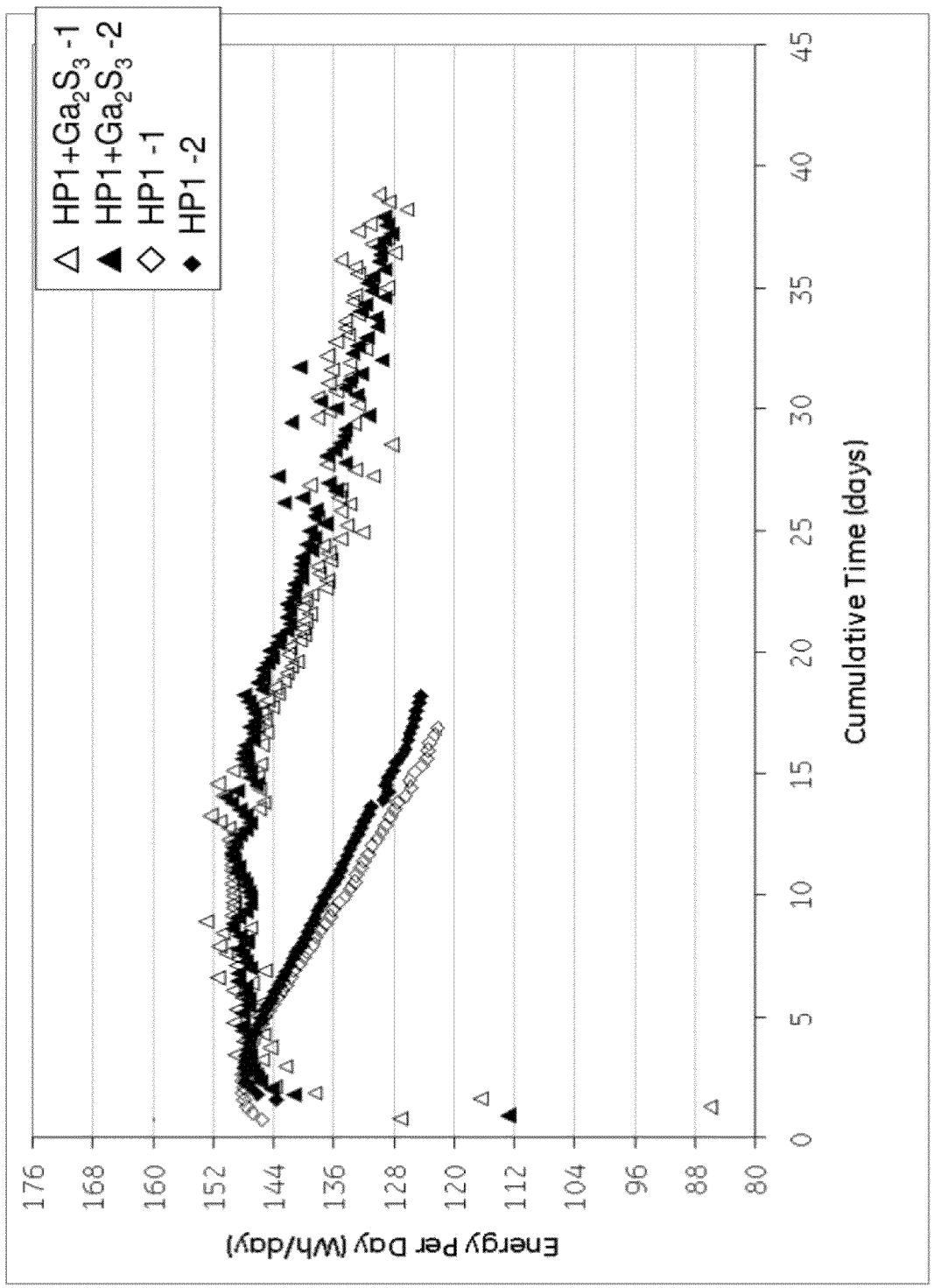
FIG. 1 is graphical data of energy per day versus cumulative time (days) for HP1+$Ga_2S_3$ formulation in a 40% depth of discharge cycle at 300° C., single cell test, compared to that of HP1 formulation for cycling Protocol A.

Disclosed herein, generally, is a cathode composition, more particularly a cathode composition for an energy storage device, as well as methods of making and using the energy storage device. Energy storage devices (e.g., batteries) can be used in various applications including uninterruptible power supply (UPS) and telecommunications (telecom) batteries. These various applications, however, have very different power supply requirements and therefore cell design, e.g., cathode compositions that are useful in one application may not be useful in other applications. For example, for UPS applications, a short, high power discharge is needed, e.g., a discharge of greater than or equal to 155 watts (W) per a standard size cell for a period of 10 to 20 minutes (min). For telecom applications, a low power discharge for a long period of time is desired, e.g., a discharge of 9.5 W per a standard size cell for a period of a few hours (hrs). The recharge period for the telecom application should be less than 5 hours, while in the UPS application the recharge time is practically not limited and therefore can be well over 5 hours.

In one embodiment, the cathode composition comprises: transition metal(s) and/or transition metal salt(s); alkali metal halide(s); electrolyte salt(s) comprising alkali metal halide(s) and metal halide(s); and sulfide compound(s) comprising gallium sulfide, antimony sulfide, or a combination comprising at least one of the foregoing sulfide compounds.

Possible transition metals include nickel, iron, cobalt, chromium, manganese, molybdenum, zinc, and antimony, as well as combinations comprising at least one of the foregoing. In some embodiments, the transition metal can be titanium, vanadium, niobium, molybdenum, chromium, manganese, iron, antimony, nickel, cobalt, copper, silver, cadmium, tin, lead, zinc, or a combination comprising at least one of the foregoing. In one embodiment, the transition metal can be nickel. In another embodiment, the transition metal can be copper.

The cathode composition includes an electrolyte salt comprising an alkali metal halide and a metal halide. In some embodiments, the alkali metal can include sodium, lithium, potassium, cesium, rubidium, or a combination comprising at least one of the foregoing. In some embodiments, the alkali metal includes sodium, potassium, lithium or combinations comprising at least one of the foregoing. In another embodiment, the alkali metal can be sodium.

The electrolyte salt includes halogen(s) such as chlorine, bromine, iodine and/or fluorine. In one embodiment, the halogen is chlorine.

In one embodiment, the metal halide can be aluminum halide, gallium halide, and/or tin halide, or a combination comprising at least one of the foregoing. In one embodiment, the metal halide can be aluminum halide.

The electrolyte salt comprising an alkali metal and a metal halide has a melting point of less than or equal to about 300° C. In one embodiment, the salt of the alkali metal and a metal halide has a melting point of about 150° C. to about 300° C., e.g., about 250° C. to about 300° C.; about 200° C. to about 250° C.; or about 150° C. to about 200° C.

In some embodiments, the electrolyte composition includes a metal halide and aluminum halide in a molar ratio of about 1:1 to about 1:2. In some embodiments, the electrolyte composition comprises sodium chloride and aluminum chloride in a molar ratio of about 0.52:0.48 to 0.45:0.55.

The cathode composition includes an alkali metal halide. In one embodiment, the alkali metal halide can be sodium chloride, sodium iodide, sodium bromide, sodium fluoride, potassium chloride, potassium iodide, potassium bromide, potassium fluoride, lithium chloride, lithium iodide, lithium bromide, lithium fluoride, cesium chloride, and the like, as well as a combination comprising at least one of the foregoing. In one embodiment, the cathode composition can further include aluminum.

The cathode composition includes a metal sulfide compound comprising gallium sulfide and/or antimony sulfide. In some embodiments of the cathode composition, the only sulfide compounds are gallium sulfide and/or antimony sulfide. Other embodiments of the cathode composition can optionally further comprise other sulfide compounds such as those having the formula MSn wherein M is a metal and n is number equal or greater than 0.5. In one embodiment, the sulfide compound can be formed in-situ.

In one embodiment, the sulfide compound is present in an amount of about 0.5 weight percent (wt %) to about 10 wt %, specifically, about 0.5 wt % to about 5 wt %, more specifically, about 1 wt % to about 4 wt %, based on the total weight of the active cathode composition (i.e., the cathode composition excluding the electrolyte). In another embodiment, the sulfide compound is present in an amount of about 4 wt % to about 7 wt %, or about 7 wt % to about 10 wt %, based on the total weight of the active cathode composition.

The cathode composition can include additives that can affect performance. Such performance additives can increase ionic conductivity, increase or decrease solubility of the charged cathodic species, improve wetting of the solid electrolyte by the molten secondary electrolyte, or prevent ripening of the cathode microdomains, to name several utilities. The performance additive(s) can be present in an amount that is less than or equal to about 5 mole percent compared to the total combined moles of electrolyte.

When iron is present in the cathode composition, the transition metal and iron can be loaded in the form of a preformed alloy, solid solution, composition, compound or other combination. Typically, the cell, after an initial charge cycle, will be ready for use. However, when the transition metal component and additive element component are loaded separately and not in any combination other than being part of a particulate mixture, the cell can go through a plurality of cell charge/discharge cycles to activate or condition the active cathode material, e.g., to cause the transition metal component and additive element component to combine together. In one embodiment, the cathode composition can include aluminum metal.

In one embodiment, an energy storage device includes: a first compartment comprising metallic alkali metal; a second compartment comprising a cathode composition; and a solid separator capable of transporting alkali metal ions between said first and second compartments. The device includes a housing having an interior surface defining a volume. A separator is disposed in the volume. The separator has a first surface that defines at least a portion of a first compartment, and a second surface that defines a second compartment, and the first compartment is in ionic communication with the second compartment through the separator.

The separator can be sized and shaped to have a cross-sectional profile that is polygonal (e.g., square) or rounded (e.g., circular or multilobal, such as cloverleaf) to provide maximal surface area for alkali metal ions transport; and can have a width to length ratio that is greater than or equal to about 1:10. The housing can be formed from a material that is a metal, ceramic, or a composite. The metal can be, for example, nickel or steel, while the ceramic can be a metal oxide.

The ionic material transported across the separator between the anode chamber and the cathode chamber can be an alkali metal cation. Exemplary ionic material can include sodium, lithium, and potassium, as well as combinations comprising at least one of the foregoing. The anodic material is molten during use. The first compartment or the anode compartment can receive and store a reserve of anodic material. Exemplary additives for use in the anodic material include a metal oxygen scavenger such as manganese, vanadium, zirconium, aluminum, titanium, tantalum, or a combination comprising at least one of the foregoing. Other possible additives include materials that increase wetting of the separator surface by the molten anodic material. Additionally, some additives can enhance the contact or wetting between the separator and the current collector, e.g., to ensure substantially uniform current flow throughout the separator.

The separator is an alkali metal ion conductor solid electrolyte that conducts alkali metal ions during use between the first compartment and the second compartment. Exemplary separator materials include an alkali-metal-beta'-alumina, alkali-metal-beta"-alumina, alkali-metal-beta'-gallate, or alkali-metal-beta"-gallate. In one embodiment, the solid separator includes a beta'-alumina, a beta"-alumina, a gamma alumina, a micromolecular sieve (such as for example a tectosilicate, (e.g. a felspar, felspethoid or zeolite (for example synthetic zeolite such as zeolite 3A, 4A, 13X, ZSM-5, and the like))), rare-earth silicophosphates, silicon nitride ceramic, nasicon, as well as combinations comprising at least one of the foregoing. In one embodiment, the separator material includes a beta"-alumina. In one embodiment, a portion of the separator material is alpha alumina and another portion is beta"-alumina. The alpha alumina can be relatively more amenable to bonding (e.g., compression bonding) than beta alumina, and can help with sealing and/or fabrication of the energy storage device.

The separator can optionally be stabilized by the addition of lanthanum oxide, magnesium oxide (magnesia), zinc oxide, yttrium oxide (yttria), or similar oxides, as well as combinations comprising at least one of the foregoing. The amount of the stabilizer to the separator material can be less than or equal to 20 weight percent based upon total weight of the separator material, specifically, 0.5 wt % to 20 weight percent, more specifically, 1 wt % to 15 wt %, even more specifically, 2 wt % to 10 wt %, and yet more specifically, 3 wt % to 5 wt %. In one embodiment, the amount of stabilizer is 0.5 wt % to 1 wt %, while in another embodiment it is 3 wt % to 4 wt %, and in yet another embodiment it is 15 wt % to 20 wt %. The separator, sometimes referred to as beta alumina solid electrolyte (BASE) can include dopant(s).

As noted above, the separator is disposed within the volume of the housing. The separator can have a cross-sectional profile normal to the axis that is a circle, a triangle, a square, a cross, or a star. Alternatively, the separator can be about planar. A planar configuration (or with a slight dome) can be useful in a prismatic or button-type battery configuration, where the separator is domed or dimpled. Similarly, the separator can be flat or undulate. In one embodiment, the solid separator can include a shape which can be flat, undulate, domed or dimpled, or comprises a shape with a cross-sectional profile that can be polygonal (e.g., triangle, rectangular, square, and the like), rounded (e.g., an ellipse, circle, and the like), and can optionally be multilobal (e.g., cloverleaf, cross, star, and the like). The separator can be a tubular container in one embodiment having wall(s). The wall can have a thickness; and the ionic conductivity and the resistance across the wall can depend in part on the thickness. Suitable thickness can be less than 5 millimeters.

Optionally, shim structure(s) can be disposed with the volume. The shim structures support the separator within the volume of the housing. The shim structures can protect the separator from vibrations caused by motion of the cell and thus reduce or eliminate movement of the separator relative to the housing. If present, the shim structures can function as a current collector to the housing.

The energy storage device can have a plurality of current collectors including anode current collectors and cathode current collectors. The anode current collector is in electrical communication with the anode chamber and the cathode current collector is in electrical communication with the contents of the cathode chamber. Exemplary materials for the anode current collector include tungsten, titanium, nickel, copper, molybdenum, or combinations comprising at least one of the foregoing. Another material for the anode current collector can include carbon. The cathode current collector can be in various forms (e.g., a wire, paddle or mesh, and the like) formed from platinum, palladium, gold, nickel, copper, carbon, molybdenum, tungsten, tantalum, titanium, as well as combinations comprising at least one of the foregoing. The current collector can be plated or clad. In one embodiment, the current collector is free of iron.

The second compartment includes a cathode composition which includes (i) transition metal(s) and/or a transition metal salt(s); (ii) alkali metal halide(s); (iii) electrolyte salt(s) comprising alkali metal halide(s) and metal halide(s); and (iv) sulfide compound(s) comprising gallium sulfide, antimony sulfide, or a combination comprising at least one of the foregoing sulfide compounds. The salt comprising an alkali metal halide and a metal halide can have a melting point of less than or equal to about 300° C. The transition metal can be nickel, iron, cobalt, chromium, manganese, molybdenum, zinc, antimony, or combinations comprising at least one of the foregoing. In one embodiment, the alkali metal can be sodium, and separator can be beta-alumina, and the sulfide compound can be gallium sulfide. In another embodiment, the alkali metal can be potassium or lithium, with the separator then being selected to be compatible therewith, and the sulfide compound is gallium sulfide. In still another embodiment, the alkali metal can be sodium, and separator can be beta-alumina, and the sulfide compound can be antimony sulfide. In yet another embodiment, the alkali metal can be potassium or lithium, with the separator then being selected to be compatible therewith, and the sulfide compound is antimony sulfide.

A plurality of the electrochemical cells can be organized into an energy storage system. Multiple cells can be connected in series or parallel. For convenience, a group of coupled cells can be referred to as a module or pack. The ratings for the power and energy of the module can depend on such factors as the number of cells in the module. Other factors can be based on end-use application specific criteria.

In one embodiment, the energy storage device can be rechargeable over a plurality of cycles. In another embodiment, the energy storage device can be employed in a variety of applications and the plurality of cycles for recharge is dependent on factors such as charge and discharge current, depth of discharge, cell voltage limits, and the like.

Various embodiments of the energy storage system can store an amount of energy that is in a range of about 0.1 kilowatt hours (kWh) to about 100 kWh. One embodiment of the energy storage system has an energy-by-weight ratio of greater than 100 watt-hours/kilogram (Wh/kg), and/or an energy-by-volume ratio of greater than 200 watt-hours/liter (Wh/L). Another embodiment of the energy storage system has a specific power rating of greater than 150 watts/kilogram (W/kg) and/or a power-by-volume ratio of greater than 300 W/L.

In one embodiment of the energy storage system, a controller communicates with the plurality of the cells. The controller can distribute an electrical load to select cells in a cell module in response to feedback signals indicating states for each of the cells in the cell module. The controller can perform a warm-up method in which a series of heating elements are activated in a sequence to melt a frozen portion of the energy storage device in a determined manner. In another embodiment, the controller can distribute an electrical load to select cathodic materials at determined locations within individual cells.

If present, a heat management device maintains the temperature of the energy storage system. The heat management device can warm the energy storage system if too cold, and can cool the energy storage system if too hot to prevent an accelerated cell degradation. The heat management system includes a thaw profile that can maintain a minimal heat level in the anode and cathode chambers to avoid freezing cell reagents.

Another embodiment provides an energy management system that includes a second energy storage device that differs from the first energy storage device. This dual energy storage device system can address the ratio of power to energy, in that a first energy storage device can be optimized for efficient energy storage, and a second energy storage device can be optimized for power delivery. The control system can draw from either energy storage device as needed, and charge back either energy storage device that needs such a charge.

Exemplary second energy storage devices for the power piece, include a primary battery, a secondary battery, a fuel cell, or an ultracapacitor. A suitable secondary battery can be a lithium battery, lithium ion battery, lithium polymer battery, or a nickel metal hydride battery.

EXAMPLES

The following examples illustrate methods and embodiments including examples of the cathode composition, and as such should not be construed as imposing limitations upon the claims. Unless specified otherwise, all the components are commercially available from common chemical suppliers such as Sigma-Aldrich (United States), Alpha Aesar, Inc. (Ward Hill, Mass.), Spectrum Chemical Mfg. Corp. (Gardena, Calif.), and the like.

Cathode Compositions

The cathode compositions used in the examples are set forth in Table 1. In the graphs (FIGS. 1-5), the "–1" and "–2" merely denote a first and second cell of the same formulation that run on different machinery in order to prove that the test result was not test machinery dependent.

TABLE 1

| Component, (g) | Formulations | | |
| --- | --- | --- | --- |
| | HP1 | HP1 + $Ga_2S_3$ | HP1 + $Sb_2S_3$ |
| Ni | 124.18 | 124.18 | 124.18 |
| NaCl | 95.82 | 95.82 | 95.82 |
| NaF | 3.75 | 3.75 | 3.75 |
| Al | 1.34 | 1.34 | 1.34 |
| Fe | 6.89 | 6.89 | 6.89 |
| NaI | 0.97 | 0.97 | 0.97 |
| MSx | 0.00 | 2.54 | 3.66 |
| $NaAlCl_4$ | 119.00 | 119.00 | 119.00 |

The sodium chloride (Custom Powders LTD, UK, 99.99% purity) was heat treated at 240° C. under atmospheric pressure for 24 hrs, then vacuumed while hot and milled to an average particle size of 90% less than 75 micrometers (μm) in a laboratory mill in a dry glove box. Nickel powder—nickel 255 (Inco Special Products, 97.9% pure, 0.6 square meters per gram ($m^2/g$), 2.2-2.8 μm particle size), sodium halides, sodium aluminum tetrachloride $NaAlCl_4$ (Sigma-Aldrich, purity 99.99%), aluminum powder (Alfa Aesar Item #42919, −100+325 mesh, 99.97%) and, when used, metal sulfide (Alfa Aesar, 99.9%) were combined in necessary amounts, were thoroughly mixed in a roll mixer for at least 12 hrs, and were cold pressed under a linear pressure of about 110-115 bar using an Alexanderwerk WP50N/75 Roll Compactor. The pressurized material was ground under a rotating mill into granules and the fraction 0.325-1.5 millimeters (mm) was used for the cell assembly.

Preparation of Electrochemical Cells

Electrochemical cells were assembled using the hardware described as follows. Separator tubes, cloverleaf in shape, are produced according to known methods or are commercially obtained. Each tube is ceramic sodium conductive beta (β)"-alumina. The cylindrical tubes were 228 mm length. Each ceramic separator tube is glass sealed to an alpha alumina collar to form an assembly. Each assembly was placed and bonded into a carbon steel can that is the housing to form an electrochemical cell. The can size is about 38 mm×38 mm×230 mm.

The β"-alumina tube was preassembled with a cathode current collector. The electrode composition granules prepared using the procedure mentioned above, were placed in the cloverleaf shaped β"-alumina tube and densified by vibrating on a vibratory shaker in a nitrogen filled glove box. The cathode was then filled with molten sodium tetrachloroaluminate $NaAlCl_4$ under vacuum at a temperature of about 280° C. Following this, the cell was filled with inert atmosphere and was welded at a temperature of about 230° C. inside the glove box using a MaxStar Miller Welder, with UHP Argon Purge, and tested for leaks using helium.

Cell Test Protocols

All cells were assembled in the discharged state. Three different testing protocols were used. Protocol A is representative of telecom qualification testing, while Protocol C is representative of UPS qualification testing.

Protocol A

In Protocol A, in the break-in (maiden) charge the cells were charged at 325° C. in the following steps: 0.1 Ampere (A) for 2 hours, 0.5 A for 2 hours, 2.75 A to 2.67 V then potentiostatically charged at 2.67 V to the 0.5 A limit. The cells then were discharged at 325° C. with 16 A to the 32 Ah limit. Cells were tested at 300° C. with the following parameters: charge with constant current 2 A to the cell voltage 2.67 V and then at constant voltage 2.67 V until current is less than about 0.5 A; discharge at constant power 9.5 W to 15.2 Ah (40% depth of discharge) or 1.95V.

Protocol B

In Protocol B, in the break-in (maiden) charge the cells were charged at 325° C. in the following steps: 0.1 Ampere (A) for 2 hours, 0.5 A for 2 hours, 2.75 A to 2.67 V then potentiostatically charged at 2.67 V to the 0.5 A limit. The cells then were discharged at 325° C. with 16 A to the 32 Ah limit. Cells were tested at 300° C. with the following parameters: charge with constant current 2 A to the cell voltage 2.67 V and then at constant voltage 2.67 V until current is less than about 0.5 A; discharge at constant power 9.5 W to the cell capacity 30.4 Ah (80% depth of discharge) or 1.95V.

Protocol C

Each assembled cell was heated before testing as shown in Table 2 in a closed-end square aluminum pipe with a glass-fiber insulation on the top.

TABLE 2

| Temperature (° C.) | Ramp/Soak Time (Hours) |
| --- | --- |
| 160 | 1.5 ramp |
| 170 | 1 ramp |
| 330 | 1.5 ramp |
| 330 | 24 soak |
| 300 | Duration of Test |

Cell testing was performed with a 100 A, 10V, multi-channel Digatron BTS600 battery testing system according the following steps.
1. Starting at 80 milliamperes (mA) and ramping up to 5.5 A over time, charge to 2.67 V, then at 2.67V to a current of 500 mA, while at 330° C. (maiden charge).
2. Reduce temperature to 300° C. and discharge at −16 A to 1.8V or 32 Ah.
3. Charge at 10 A to 2.67V, then at 2.67V down to 500 mA.
4. Discharge at −16 A to 1.8V or 32 Ah.
5. Repeat steps 3 and 4 a total of 10 cycles.
6. Charge at 15 A to 2.67V, then at 2.67V to a current of 500 mA.
7. Discharge at −155 W to 1.8V.
8. Charge at 15 A to 2.67V, then at 2.67V to a current of 500 mA.
9. Discharge at −60 W to 22 Ah or 1.8V.
10. Charge at 15 A to 2.67V, then at 2.67V to a current of 500 mA.

11. Discharge at −110 W to 1.8V or 15 min, then at 1.8V to 15 min.
12. Repeat steps ten and eleven 100 times.
13. Go to step 6 to repeat steps 6-12 once, for a total of 214 cycles.

Conductivity of electrolytes with and without additives was measured at 300° C. using a four-point probe connected to a Solartron SI-12871287 A potentiostat and Solartron SI-1260 frequency response analyzer.

Example 1

Cells with similar nickel/iron-sodium chloride cathodes containing no sulfide compound and those containing gallium sulfide were assembled and tested according to the Protocol A. The cathode compositions are shown in Table 1. The single cell test results are illustrated in FIG. 1 showing the energy per day (watt-hours per day (Wh/day)) versus cumulative time in days for a 40% depth of discharge (DoD) at 300° C. As can be seen, the samples with the gallium sulfide, after a period of 10 days, consistently showed a higher energy per day. By day 18 the cells with no gallium sulfide had decreased to less than 125 Wh/day, while the cells with gallium sulfide had an energy of greater than 144 Wh/day. Actually, even at 35 days, the cells with the gallium sulfide had an energy of greater than 128 Wh/day. In other words, the life of the cell was unexpectedly nearly doubled.

Example 2

Figure 2:
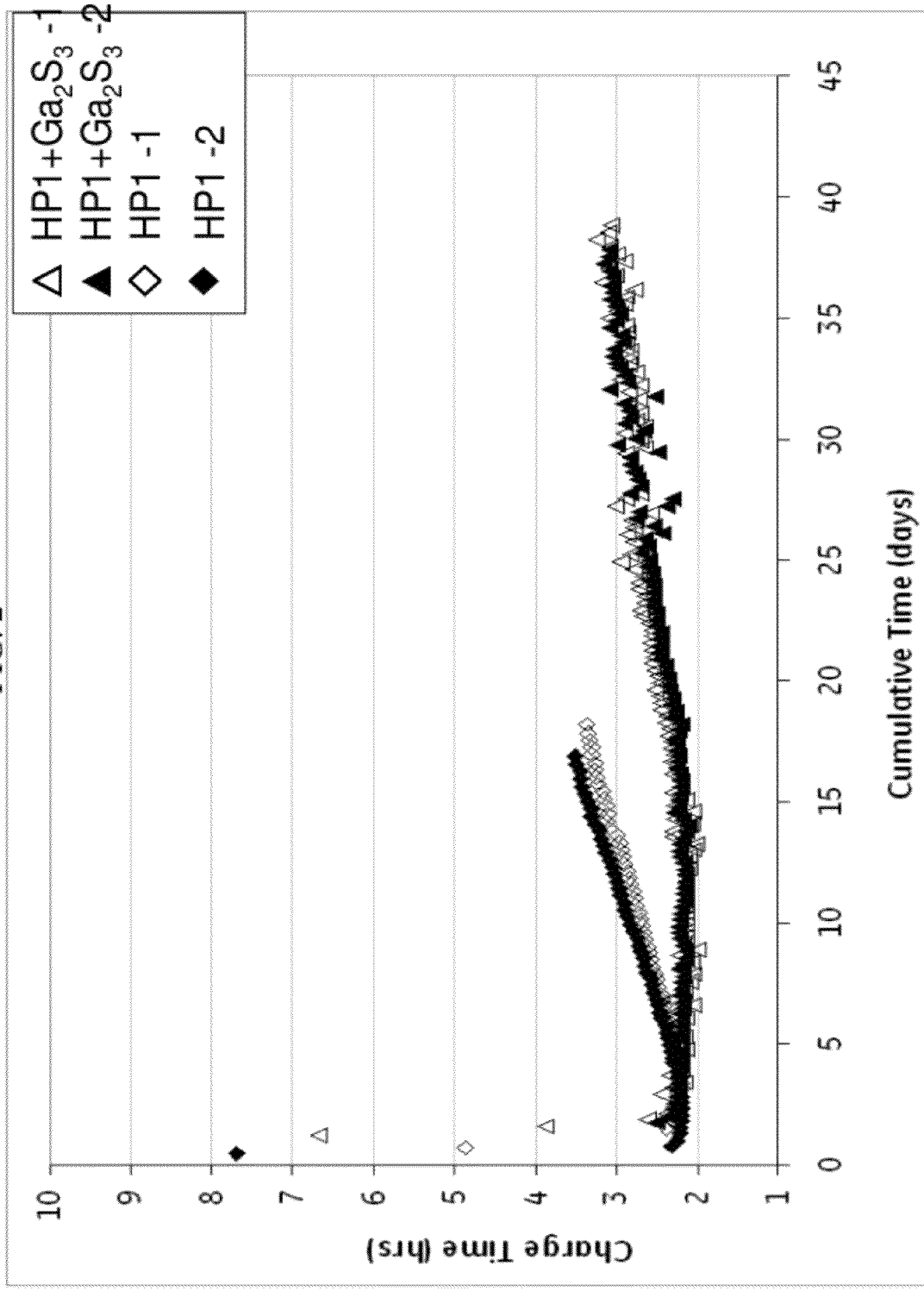
FIG. 2 is graphical data of charge time versus cumulative time (days) for a HP1+$Ga_2S_3$ formulation in a 40% depth of discharge cycle at 300° C., single cell test, compared to that of HP1 formulation cycling Protocol A.

In FIG. 2, the charge time in hours for the same cells as in FIG. 1 was determined. Similar to FIG. 1, the cells comprising a cathode composition with gallium sulfide significantly outperformed the cells with a cathode composition without gallium sulfide. Here, the charge time reached over 3 hours for HP1 by day 14, but $Ga_2S_3$ did not reach a charge time of 3 hours until day 27, and not consistently until day 33. Furthermore, by day 18, HP1 had exceeded a charge time of 3.5 in one case and 3.3 in the other. Unexpectedly, $Ga_2S_3$, in more than 36 days, did not exceed 3.3 hours charge time. With the gallium sulfide in the cathode composition, a charge time of less than 3 hours can be maintained for greater than or equal to 20 days, and even greater than or equal to 25 days, and a charge time of less than 3.4 can be maintained for greater than or equal to 20 days, greater than or equal to 30 days, and even greater than or equal to 35 days.

Example 3

Figure 3:
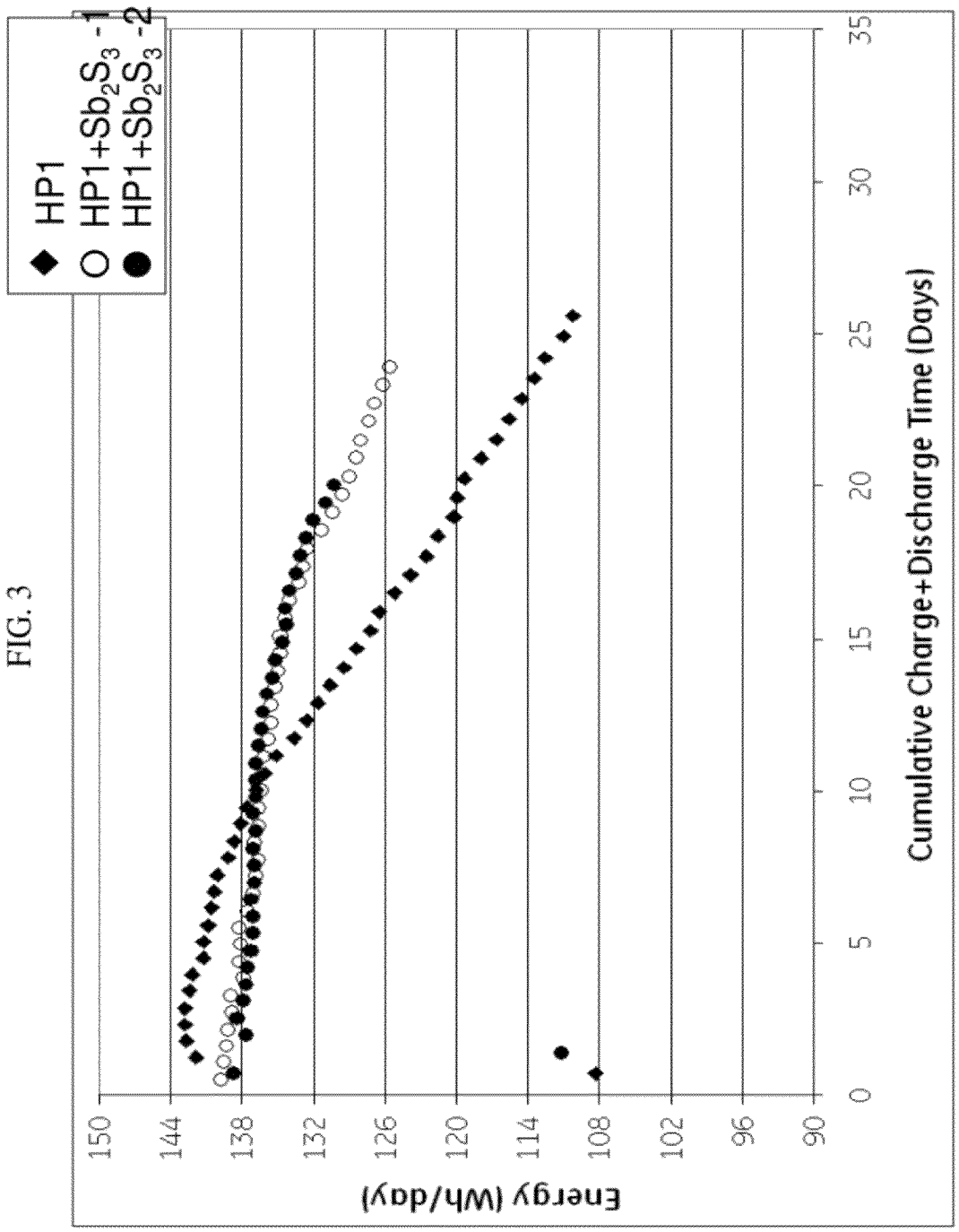
FIG. 3 is graphical data of energy per day versus cumulative time (days) for a HP1+$Sb_2S_3$ formulation in a 80% depth of discharge cycle at 300° C., single cell test, compared to that of HP1 formulation cycling Protocol B.

Cells with similar nickel/iron-sodium chloride cathodes containing no sulfide compound and those containing antimony sulfide were assembled and tested according the Protocol A. The cathode compositions are shown in Table 1. The single cell test results are illustrated in FIG. 3 showing the energy per day (Wh/day) versus cumulative charge and discharge times in days for an 80% DoD at 300° C. As can be seen, the samples with the antimony sulfide, after a period of 10 days, consistently showed a higher energy per day under both 80% DoD. By day 25 the cells with no antimony sulfide had about 10 Wh/day lower energy than the cells with the antimony sulfide. In other words, the life of the cell was unexpectedly nearly doubled.

Example 4

Figure 4:
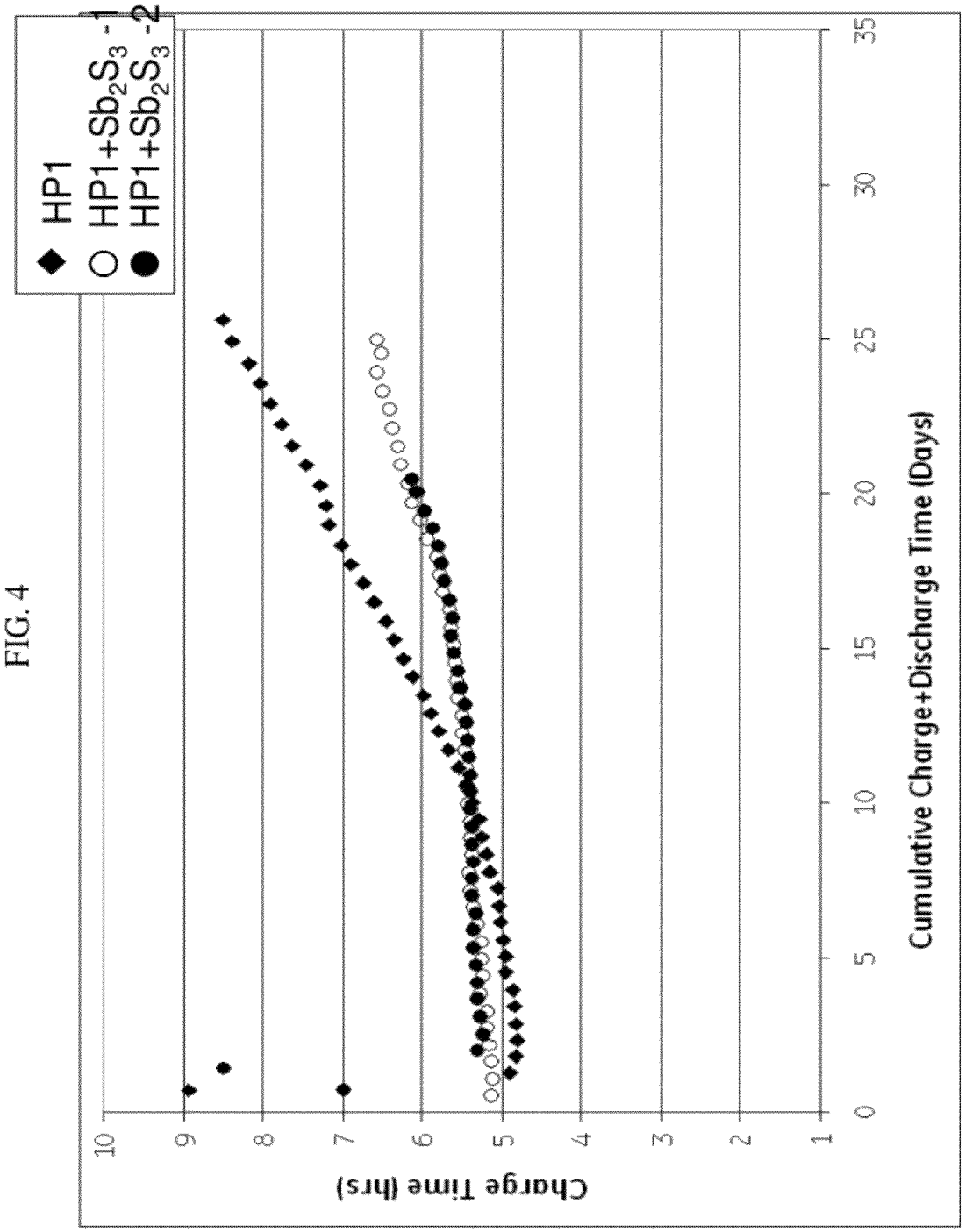
FIG. 4 is graphical data of charge time versus cumulative charge and discharge time (days) for a HP1+$Sb_2S_3$ formulation in a 80% depth of discharge cycle at 300° C., single cell test, compared to that of HP1 formulation cycling Protocol B.

In FIG. 4, the charge time in hours for the same cells as in FIG. 3 was determined. Similar to FIG. 3, the cells comprising a cathode composition with antimony sulfide significantly outperformed the cells with a cathode composition without antimony sulfide. Here, after about 10 days, the cell without the antimony sulfide in the cathode began to significantly increase in charge time to reach about 8.5 hours in less than 26 days at 80% DoD. Furthermore, the highest charged time reached by the cell with the antimony sulfide in the cathode was under 6.7 hours at 80% DoD and about 25 days.

Example 5

Figure 5:
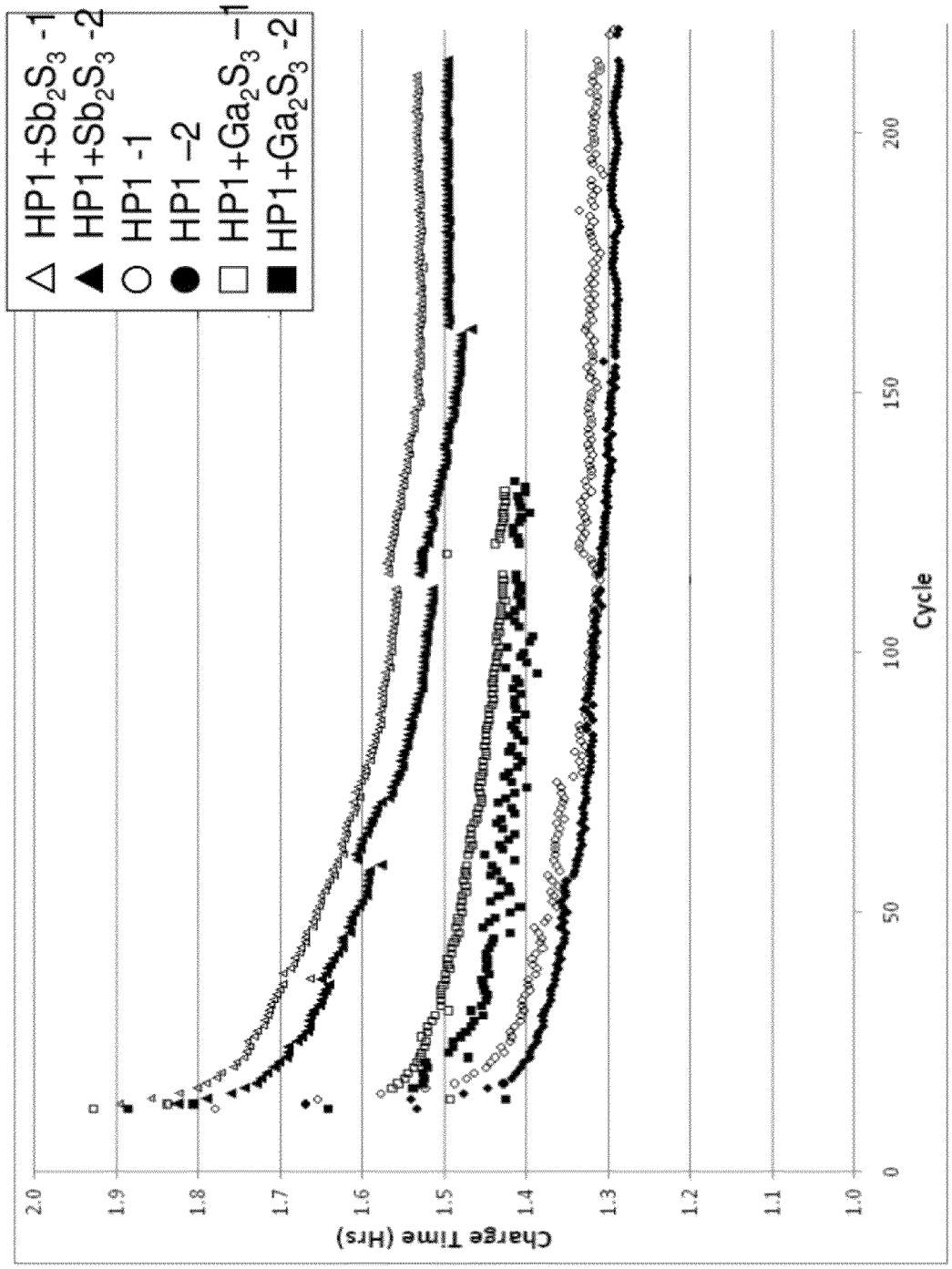
FIG. 5 is graphical data of charge time versus cycle for HP1+$Ga_2S_3$ and HP1+$Sb_2S_3$ compared to that of HP1 formulation for cycling Protocol C (an uninterrupted power supply (UPS) cycle).

FIG. 5 illustrates the cells performance in terms of charge time when the same formulations are tested under Protocol C. It was expected that cathodes with gallium sulfide or antimony sulfide would reduce the cell charge time in the same way it happened for the Protocol A. As can be seen in the Figure the cells with the antimony sulfide performed particularly poorly, consistently having the highest charge time, with the cells comprising gallium sulfide in the cathode composition also performing worse than cells with no sulfide in the cathode composition. It could not be predicted that the antimony sulfide and/or the gallium sulfide would enhance performance under Protocol A (telecom conditions).

Example 6

Figure 6:
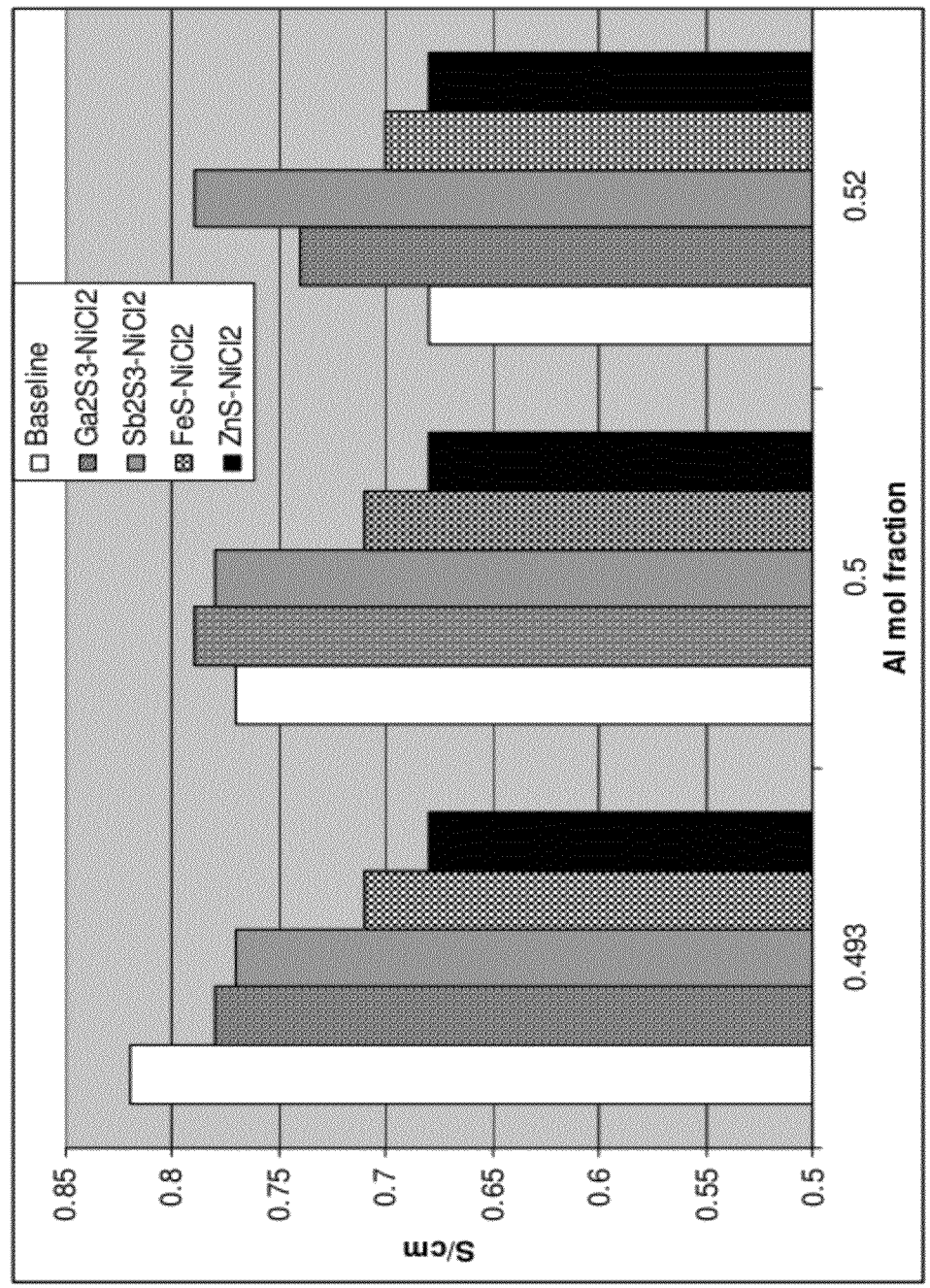
FIG. 6 is a bar graph of 300° C. conductivity of the electrolyte containing additives.

FIG. 6 compares the electrolyte conductivity (seimens per centimeter (S/cm)) at 300° C. to the mole fraction of aluminum when the nickel chloride cathode comprises no sulfide (white bar), gallium sulfide (black and white striped bar), antimony sulfide (gray bar), iron sulfide (black and white checkered bar), and zinc sulfide (black bar). It was unexpectedly discovered that conductivity of electrolyte in the presence of gallium and antimony sulfides is ether slightly reduced (in chloro basic electrolyte) or even improved (in chloro neutral or acidic electrolyte) in contrast to zinc and commonly used iron sulfides. Improved conductivity will increase the battery power and cycle life.

The foregoing examples are illustrative of some features of the invention. The appended claims are intended to claim the invention as broadly as has been conceived and the examples herein presented are illustrative of selected embodiments from a multitude of all possible embodiments. Accordingly, it is Applicants' intention that the appended claims not limit to the illustrated features of the invention by the choice of examples utilized. As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations. Advances in science and technology can make equivalents and substitutions possible that are not now contemplated by reason of the imprecision of language; these variations should be covered by the appended claims.

As used herein, cathodic material is the material that supplies electrons during charge and is present as part of a redox reaction. Anodic material accepts electrons during charge and is present as part of the redox reaction. The cathode includes cathodic materials having differing functions: an electrode material, a support structure, and a current collector. The electrode material is present in the cathode as a participating electrochemical reactant both in its oxidized or reduced state, or at some state between full oxidation or reduction. The support structure does not undergo much if any chemical reaction during the charge/discharge, but does provide electron transport and support the electrode material as the electrode material undergoes chemical reaction and allows for a surface upon which solids can precipitate as needed. An electrolyte is a medium that provides the ion transport mechanism between the positive and negative electrodes of a cell, and can act as a solvent for the oxidized form of the electrode material. Additives that facilitate the ion transport mechanism, but do not themselves provide the mechanism, are distinguished from the electrolyte itself. "Optional" or "optionally" means that the subsequently described event or circumstance may or may not occur, and that the description includes instances where the event occurs and instances where it does not.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Furthermore, whenever a particular feature of the invention is said to comprise or consist of at least one of a number of elements of a group and combinations thereof, it is understood that the feature can comprise or consist of any of the elements of the group, either individually or in combination with any of the other elements of that group.

What is claimed is:

1. A cathode composition comprising:
   a transition metal and/or a transition metal salt, wherein the transition metal is selected from the group consisting of nickel, iron, cobalt, chromium, manganese, molybdenum, zinc, antimony, and a combination comprising at least one of the foregoing;
   a first alkali metal halide;
   an electrolyte salt comprising a second alkali metal halide different from the first alkali metal halide, and a metal halide, wherein the salt has a melting point of less than about 300° C.; and
   a sulfide compound selected from the group consisting of gallium sulfide, antimony sulfide, and a combination comprising at least one of the foregoing.

2. The cathode composition according to claim 1, wherein the transition metal comprises nickel.

3. The cathode composition according to claim 2, wherein the transition metal further comprises iron.

4. The cathode composition according to claim 1, wherein the alkali metal of the first alkali metal halide and the alkali metal of the second metal halide independently comprise sodium, potassium, lithium or a combination comprising at least one of the foregoing.

5. The cathode composition according to claim 1, wherein the electrolyte salt comprises a halogen selected from the group consisting of chlorine, bromine, fluorine, and a combination comprising at least one of the foregoing.

6. The cathode composition according to claim 1, wherein the electrolyte salt comprises an alkali metal halide and a metal halide, said electrolyte salt having a melting point of about 150° C. to about 300° C.

7. The cathode composition according to claim 6, wherein the electrolyte salt comprises sodium chloride and aluminum chloride in a molar ratio of about 0.52:0.48 to about 0.45:0.55.

8. The cathode composition according to claim 1, further comprising aluminum metal.

9. The cathode composition according to claim 1, further comprising an additional sulfide compound having the formula $MS_n$, wherein M is a metal and n is equal or greater than 0.5.

10. The cathode composition according to claim 1, wherein the sulfide compound is present in an amount of about 0.5 wt % to about 5.0 wt % based on the total weight of the cathode composition.

11. The cathode composition according to claim 1, wherein the sulfide compound is gallium sulfide.

12. The cathode composition according to claim 1, wherein the sulfide compound is antimony sulfide.

13. An article comprising:
    a cathode; wherein the cathode comprises:
       a transition metal and/or a transition metal salt, wherein the transition metal is selected from the group consisting of nickel, iron, cobalt, chromium, manganese, molybdenum, zinc, antimony, and a combination comprising at least one of the foregoing;
       a first alkali metal halide;
       an electrolyte salt comprising a second alkali metal halide different from the first alkali metal halide, and a metal halide, wherein the salt has a melting point of less than about 300° C.; and
       a sulfide compound selected from the group consisting of gallium sulfide, antimony sulfide, and a combination comprising at least one of the foregoing.

14. The article according to claim 13, wherein the article is part of an energy storage device.

15. The energy storage device of claim 14, further comprising: a first compartment comprising a metallic alkali metal and a solid separator capable of transporting alkali metal ions between the cathode and the second compartments.

16. The energy storage device according to claim 15, wherein said device is rechargeable over a plurality of cycles.

17. The energy storage device according to claim 15, wherein the solid separator comprises a beta-alumina, a beta"-alumina, a gamma alumina, a micromolecular sieve, a silicon nitride, a silicophosphate, or nasicon.

18. The energy storage device according to claim 15, wherein the solid separator comprises a shape which is flat, undulate, domed or dimpled, and/or comprises a shape with a cross-sectional profile that is an ellipse, triangle, cross, star, circle, cloverleaf, rectangular, square, or other multilobal configuration.

19. The energy storage device according to claim 15, wherein the sulfide compound is gallium sulfide.

20. The energy storage device according to claim 15, wherein the sulfide compound is antimony sulfide.

* * * * *